Feb. 17, 1931.  W. E. PHILIPS  1,793,246
APPARATUS FOR CLEANING STICKY MATERIAL FROM CONVEYER BELTS
Filed Feb. 9, 1929
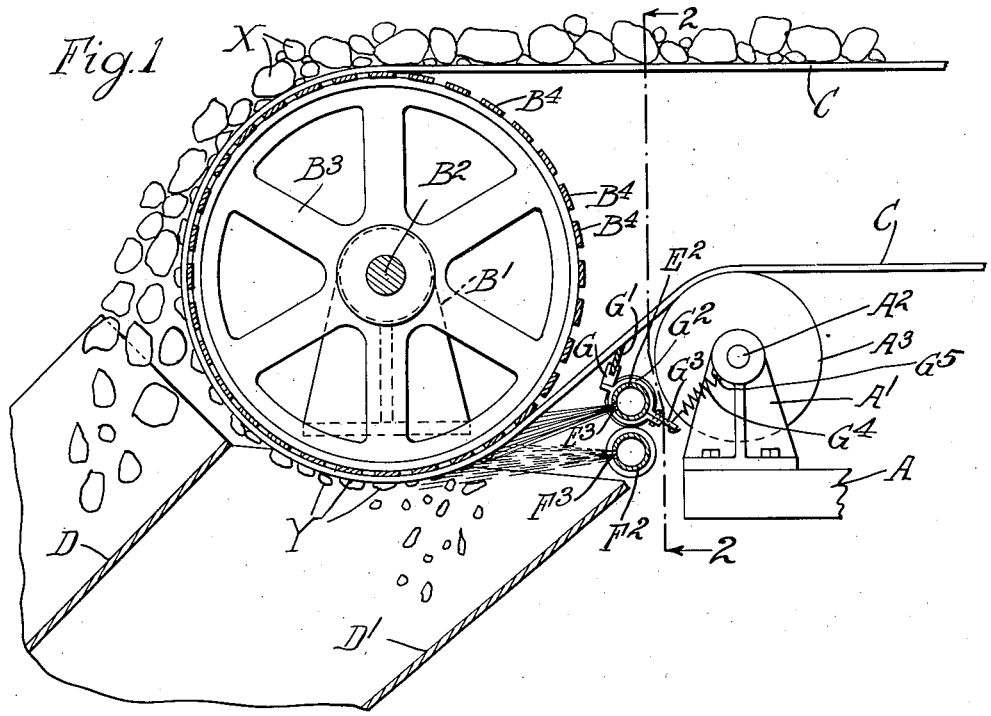
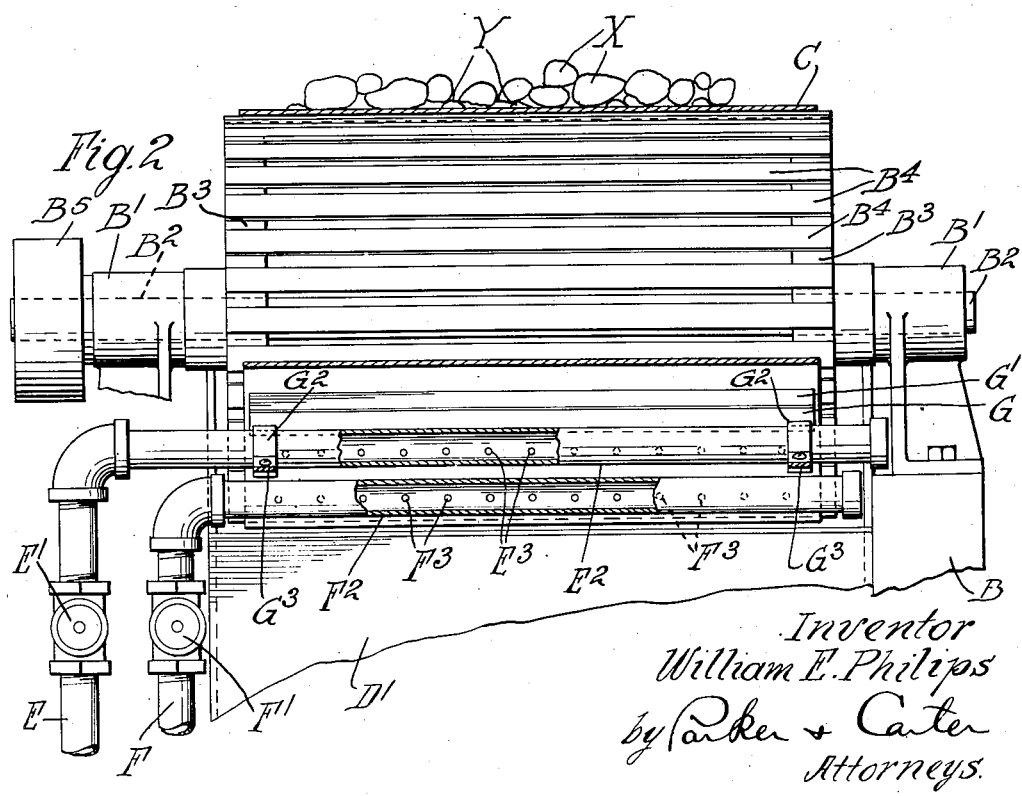
Inventor
William E. Philips
by Parker + Carter
Attorneys.

Patented Feb. 17, 1931

1,793,246

UNITED STATES PATENT OFFICE

WILLIAM E. PHILIPS, OF CHICAGO, ILLINOIS, ASSIGNOR TO LINK-BELT COMPANY, OF CHICAGO, ILLINOIS, A CORPORATION OF ILLINOIS

APPARATUS FOR CLEANING STICKY MATERIAL FROM CONVEYER BELTS

Application filed February 9, 1929. Serial No. 338,700.

This invention relates to a method of and apparatus for removing adhesive material from conveyer belts. It has for one object, therefore, to remove this material from the belt, preferably at the point of discharge. In conveying apparatus belt conveyers are frequently used to handle sticky and adhesive material. Mixed concrete, clay, wet coal and any other material which is handled by a belt conveyer has a tendency to adhere to it, and after passing the point of discharge creates a problem which it is one of the objects of the present invention to solve. Other objects will appear from time to time in the course of the specification and claims.

The invention is illustrated more or less diagrammatically in the accompanying drawings wherein:

Figure 1 is a longitudinal vertical cross section through the discharge end of the belt conveyer;

Figure 2 is a transverse, vertical cross section taken on line 2—2 of Figure 1.

Like parts are designated by like characters throughout the specification and drawings.

A indicates a foundation upon which a pair of bearing supports $A^1$ is positioned. These supports carry a shaft $A^2$ upon which is mounted a roller $A^3$.

B indicates another foundation or supporting member upon which bearing supports $B^1$, $B^1$ are positioned. In these bearings is journaled a shaft $B^2$, upon which is mounted a discharge pulley formed preferably of spoked members $B^3$, $B^3$ and provided with slats $B^4$, $B^4$. These slats are preferably separated each from the other so as to provide a pulley of uneven surface. The invention, however, is not limited to this feature and is applicable to a situation where a pulley presenting a smooth or solid surface is used. $B^5$ is a pulley mounted on the shaft $B^2$ by means of which the discharge pulley may be rotated.

C is a conveyer belt adapted to run about the discharge pulley and the smaller pulley $A^3$.

D is a discharge chute adapted to receive material which readily flows from the pulley at the point of discharge. $D^1$ is a discharge chute adapted to receive material of a more sticky or adhesive nature which does not fall from the belt readily but is washed or otherwise displaced from the belt by the apparatus of this invention. For some purposes two such chutes are used. For other purposes a single chute may be used to receive both classes of material.

E indicates a supply pipe which may be connected with a source of water supply. $E^1$ is a valve controlling the flow through the pipe. $E^2$ is a discharge or nozzle member connected to the pipe E and provided with perforations $E^3$ through which water may be discharged against the belt and the material upon it as shown in Figure 1.

F is a supply pipe which may be connected with the source of air pressure. $F^1$ is a valve controlling discharge from the pipe. $F^2$ is a nozzle or discharge member provided with perforations $F^3$. When air is permitted to flow through the pipe F past the valve $F^1$, it will be discharged through the perforations of the nozzle member $F^2$ as indicated, particularly in Figure 1. While usually it will be found most convenient to use water and air, under certain circumstances other fluids may be used. Steam may be substituted for the water and the air or only a single fluid may be used. For normal purposes the belt cleaning equipment will be located adjacent the point of discharge from the conveyer belt so that as the belt leaves the point of discharge, it will be clean.

G is a scraper frame within which is positioned a scraping member $G^1$. This may be of flexible material, such as rubber. This scraper frame G is provided with members $G^2$ which in the form of the invention illustrated herewith are positioned about the nozzle member $E^2$. An extension $G^3$ is formed on the frame member G and at the free end of this extension it is attached to one end of the spring $G^4$. The other end of this spring is attached as at $G^5$ on the bearing support $A^1$. Preferably two such members $G^3$ and two springs $G^4$ will be used. By means of this arrangement the scraper is pressed tightly against the belt and thus serves to move any remaining material which has been loosened but not actually removed from the belt by the air and water and other fluid which has been used.

It will be realized that while I have shown and described an operative device, many changes may be made in the size, shape, relation, distribution and proportion of parts without departing materially from the spirit of my invention, and I wish therefore that my description and showing be considered as in a large measure diagrammatic.

In particular, almost any fluid might be used and any combination of fluids might be used. Air might be used alone or air and water or air and steam or steam and water and practically any combination of fluids or any single fluid might be used. For certain purposes a sand blast might be used. Under certain circumstances the fluid blasts are so effective that it is unnecessary to use the mechanical wiper. It should be understood that the belt cleaning apparatus may be put in anywhere that the belt is seeking to discharge material. It is not necessary that it be at the end of a conveyer system.

The use and operation of this invention are as follows:

The equipment illustrated is installed at the discharge point, whether it be at the end or intermediate the ends of the belt conveyer. The material carried by the conveyer consists of particles X which will leave the belt readily, and particles Y which tend to adhere to the belt. The discharge pulley is provided with slats which are separated from each other and tends to stretch or crimp the belt around these bars and thus to loosen the material and cause more of it to discharge than would otherwise be the case. Frequently, however, some of the material adheres to the belt. When the belt with this material adhering to it passes to the point where the fluid jets are directed against it, this material is moistened and the water jet, when that is used, tends to soften and wash away the material and the air jet, when that is used, tends to drive off the material which has been moistened and loosened by the water jet. As has been stated above, practically any fluid may be used, and it is not essential that two fluids be used. It is usually found desirable, however, and cheaper to use air and water.

Any particles still remaining attached to the belt after the latter has moved beyond the area where it is subjected to the jets of fluid, will be scraped off by the scraper which is preferably held against the belt by the tension spring shown.

I claim:

1. The combination with a conveyer of means for projecting against it separate blasts of two different fluids.

2. The combination with a conveyer of means for projecting against it separate blasts of two different fluids to strike it at approximately the same point.

3. The combination with a conveyer of means for projecting against it separate blasts of two different fluids, and a scraping device for mechanically scraping the conveyer.

4. The combination with a conveyer of means for projecting against it separate blasts of two different fluids to strike it at approximately the same point, and a scraping device for mechanically scraping the conveyer.

5. The combination with a conveyer of means for projecting against it separate blasts of air and water.

6. The combination with a conveyer belt with a pulley about which it passes for bending it through a large arc and means carried by said pulley for simultaneously crimping said conveyer at a series of points between the ends of the said arc, and a fluid projecting device for projecting a blast of fluid against said conveyer after it has been crimped.

7. The combination with a conveyer of a pulley over which it passes, which bends it in a large arc, and means carried by said pulley for additionally bending the conveyer sharply a number of times and means for projecting against it separate blasts of air and water.

8. The combination with a conveyer of a pulley over which it passes, which bends it in a large arc, and means carried by said pulley for additionally bending the conveyer sharply and means for projecting against it at its point of bending separate blasts of air and water.

9. In combination, a flexible conveyer belt, a discharge pulley therefor provided with separated belt contacting members in the form of slats whereby an uneven belt contacting surface is provided, and a water projecting means and air projecting means adapted respectively to project water and air against the belt while it is bent, in combination with a chute adapted to receive material which falls freely from the conveyer and a separate chute adapted to receive material which is removed from the conveyer mechanically, and a scraper contacting the surface of the belt and held thereagainst yieldingly.

Signed at Chicago, county of Cook, and State of Illinois, this 22 day of Jan., 1929.

WILLIAM E. PHILIPS.